United States Patent [19]

Komabayashi et al.

[11] 3,823,479
[45] July 16, 1974

[54] DRAWING INSTRUMENT
[75] Inventors: Yoshibumi Komabayashi; Tadayoshi Iwai, both of Tokyo, Japan
[73] Assignee: Muto Industrial Company Ltd., Tokyo, Japan
[22] Filed: July 21, 1971
[21] Appl. No.: 164,767

[30] Foreign Application Priority Data
Dec. 28, 1970 Japan............................ 45-135592
Apr. 13, 1971 Japan............................ 46-27959

[52] U.S. Cl.................................................. 33/76 R
[51] Int. Cl............................................. B43l 13/02
[58] Field of Search.......................... 33/75, 76, 79

[56] References Cited
UNITED STATES PATENTS
906,686   1/1909   Schellenbach........................ 33/99
2,070,675   2/1937   Niemeyer............................ 33/75 R FOREIGN PATENTS OR APPLICATIONS
638,865   6/1950   Great Britain..................... 33/79 R
266,127   4/1950   Switzerland........................ 33/79 R Primary Examiner—Harry N. Haroian
Attorney, Agent, or Firm—Wenderoth, Lind & Ponack

[57] ABSTRACT

A drawing machine comprising a protractor and a mechanism for effecting angular displacement of ruler means. The instrument further comprises a dial which is attached to a head movable along the X-Y ordinate axis on the drawing board and parallel thereto. The dial is graduated in degrees and minutes of angles for indicating an angular displacement of the ruler means represented by a variation in the relative positions of the protractor and ruler means. The angular displacement of the ruler means is indicated in degrees by the position of an index on the scales of the protractor and/or in minutes by the amount of deflection of a pointer on the dial.

2 Claims, 10 Drawing Figures

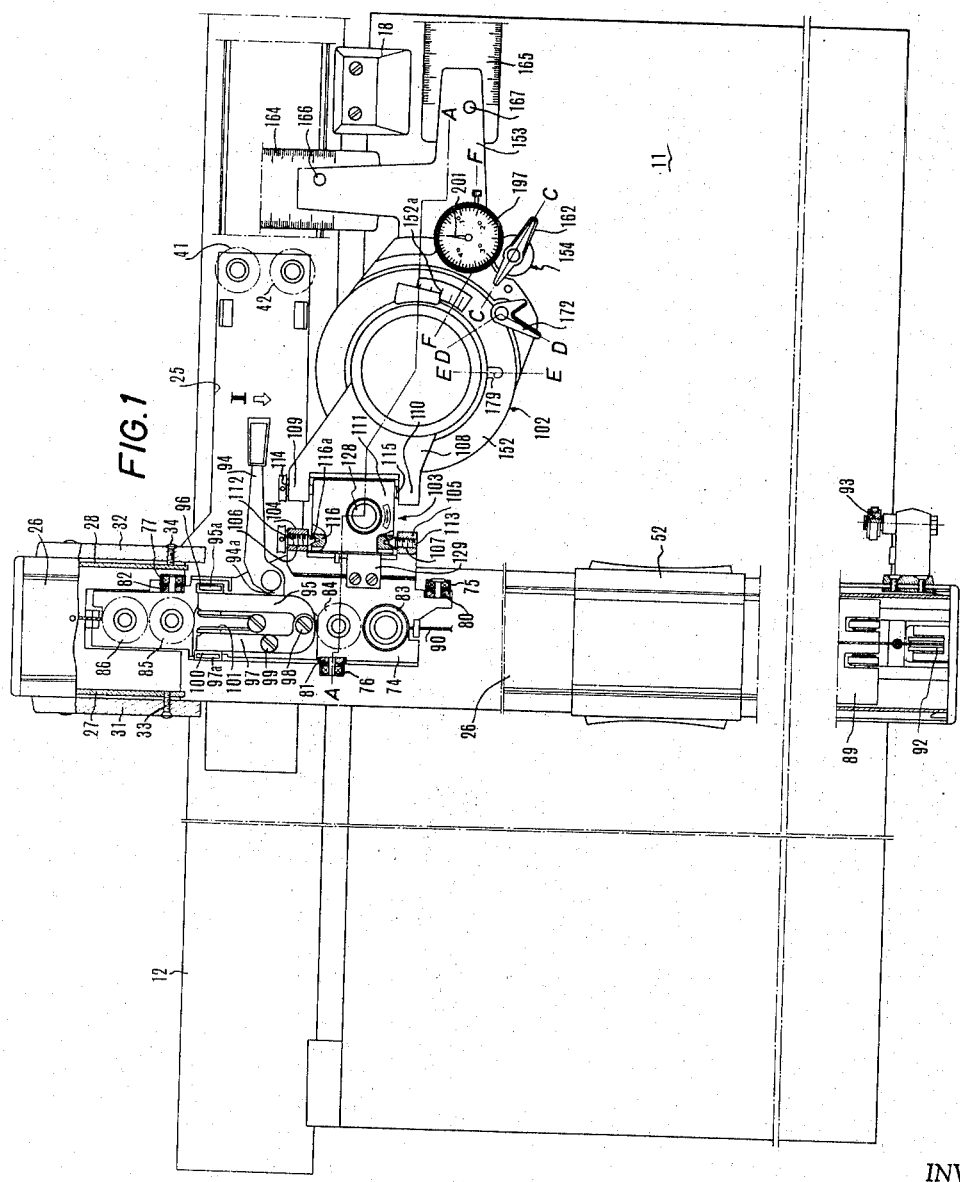

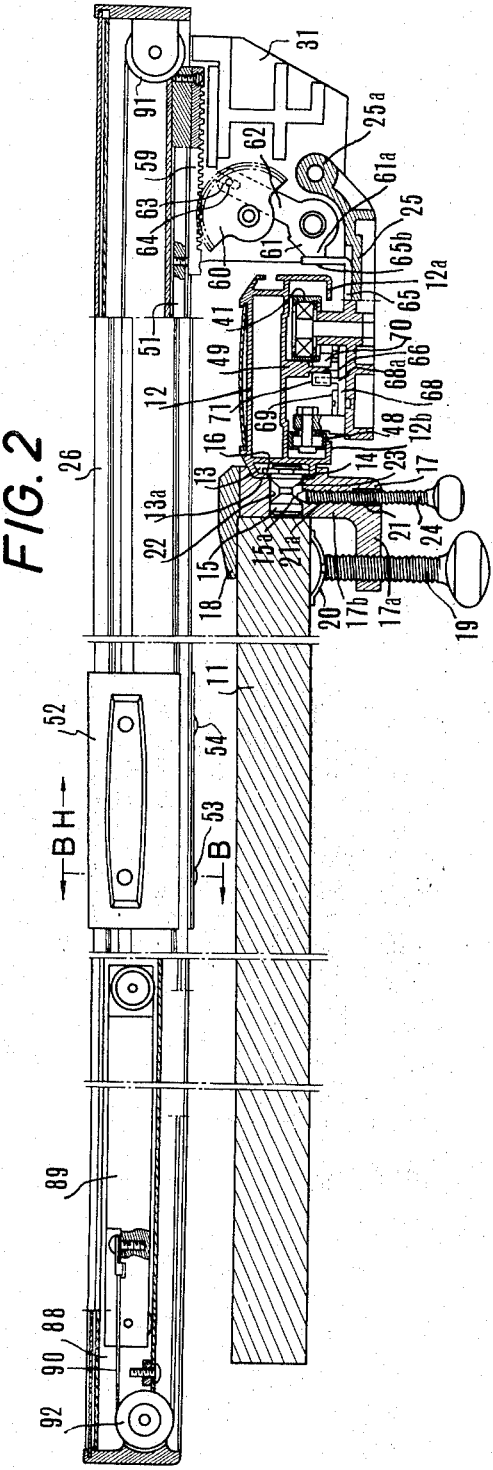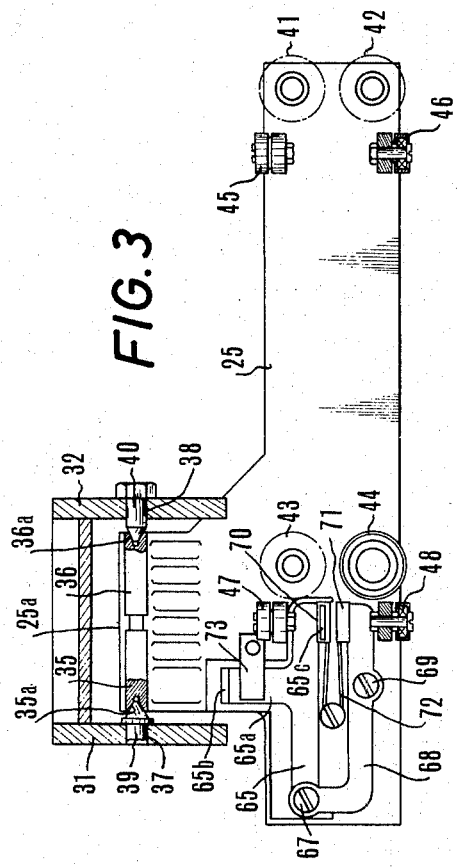

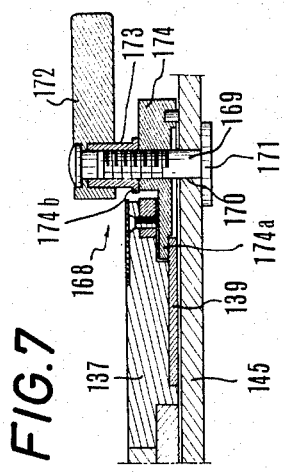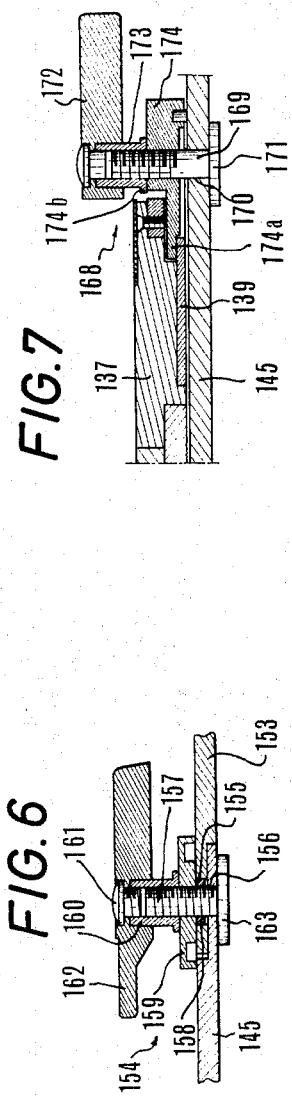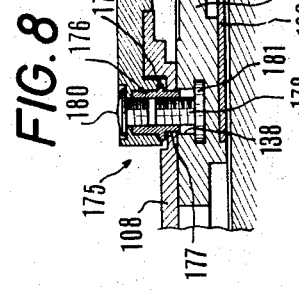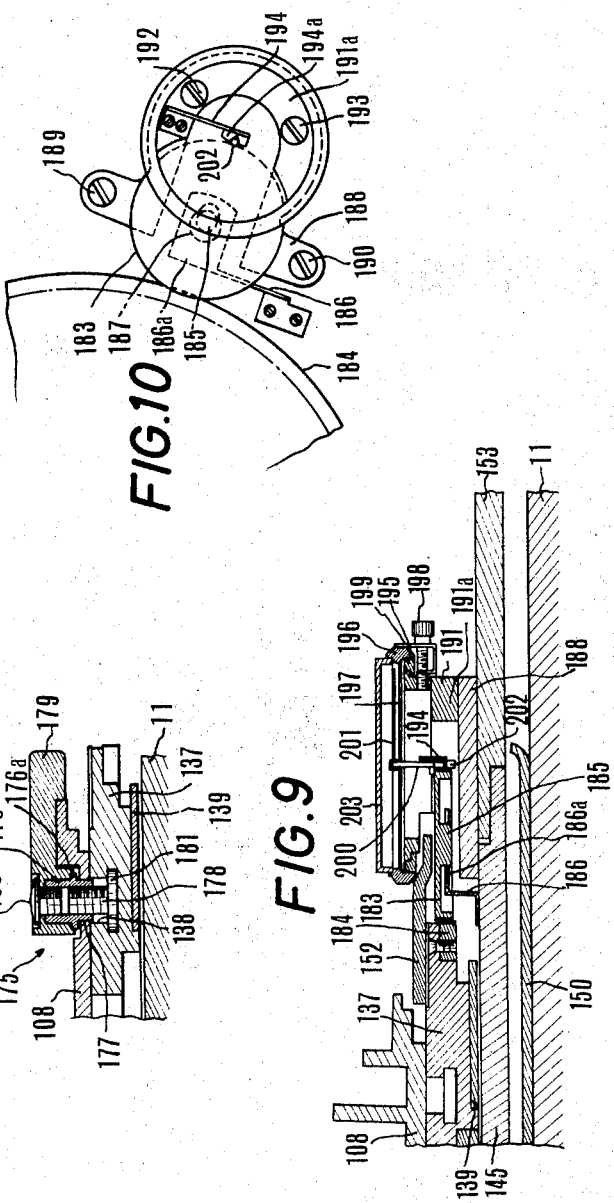

DRAWING INSTRUMENT

BACKGROUND OF THE INVENTION

Drawing instruments of the prior art are provided with a protractor for measuring and indicating angular displacement of a ruler. Angular displacement of the ruler can be roughly measured and expressed in round numbers in degrees by means of the protractor, but it is not easy to express angular displacement precisely.

When it is desired to measure angular displacement of the ruler not only in degrees but also in minutes, it is required to use a vernier in combination with the protractor for measuring and reading angular displacement in minutes.

Because of this, when conventional drawing instruments are employed, difficulty is faced in precisely measuring and reading angular displacement of the ruler in degrees and minutes, since the value must be obtained by both protractor scale division and vernier scale division. Particularly, a highly advanced skill is required to determine angular displacement of the ruler in minutes by reading vernier scale divisions.

SUMMARY OF THE INVENTION

A main object of this invention is to provide a drawing instrument which permits the user to quickly and accurately measure and read angular displacement of ruler means in degrees and minutes such drawing instrument comprising means for faithfully converting a precise angular displacement of the ruler means into the amount of deflection of a pointer on a dial to permit reading of the angular displacement of the ruler means on the dial, while the angular displacement in round number in degrees of the ruler means is indicated by the position of an index on the scales of the protractor.

The head is provided with the aforementioned protractor which is normally maintained at a predetermined angle with respect to the X-Y ordinate axis on the drawing board irrespective of the movement of the head, and a base plate which can be angularly rotated about the central point of the protractor by turning a handle connected to the base plate. The ruler means is connected to the base plate. According to this invention, a gear is concentrically mounted on the protractor for meshing engagement with a gear mounted on the base plate which rotates the gear on the protractor while rotating on its own axis. The rotation on its own axis of the gear on the base plate is faithfully transmitted to the pointer for the dial mounted on the base plate. It is thus possible to read the angular displacement of the base plate with respect to the protractor and hence the angular displacement of the ruler means in degrees and minutes from the amount of deflection of the pointer on the dial. While the angular displacement of the ruler means in degrees and minutes can thus be determined precisely from reading the angular displacement of the pointer on the dial, the angular displacement of the ruler means in round numbers in degrees can be determined by reading the position of the index on the scales of the protractor.

Another object of this invention is to provide a drawing instrument which comprises an intermediate gear interposed between a pinion mounted on a pointer supporting shaft on the dial coaxially with the pointer and the aforementioned gear mounted on the protractor concentrically therewith so as to provide a predetermined spacing between the pinion and gear, whereby the dial can be disposed on one side of the protractor without overlying the same. If the intermediate gear were not provided, the dial would partly overlie the protractor when the former is disposed on the base plate, so that the scale graduated in degrees on the protractor would be concealed from view. This disadvantage might be obviated by other means, such as by forming a window in the dial for permitting the draftsman to see the scales on the protractor through this window. However, the provision of a window is not desirable in actual practice because it not only renders the mechanism complex but also makes it impossible to provide a cover on the protractor.

Additional objects as well as features and advantages of this invention will become evident from the description set forth hereinafter when considered in conjunction with the accompanying drawings which show a preferred embodiment.

According to this invention, there is provided a drawing instrument comprising a mechanism for moving a head along the X-Y ordinate axis on a drawing board and parallel thereto, such head being provided with means for indicating angular displacement of ruler means in degrees and minutes by the amount of deflection of a pointer on a dial.

It is to be understood, however, that this invention is not limited to the specific form of the embodiment shown and described herein, and that many changes and modifications may be made therein without departing from the scope of the invention which is defined in the appended claims which should therefore be interpreted to cover such changes and modifications, the drawings and specification being merely illustrative and not limiting the scope of this invention.

BRIEF DESCRIPTION OF THE DRAWINGS

FIG. 1 is a plan view of the drawing instrument in its entirety including the protractor according to this invention, with portions of the X-rail and Y-rail being cut out;

FIG. 2 is a vertical sectional side view of the drawing instrument of FIG. 1, with a portion of the Y-rail not being shown in section;

FIG. 3 is a plan view showing the manner in which the X-carsol is connected to the Y-rail and showing brake means;

FIG. 6 is a sectional view taken along the line C—C of FIG. 1 and showing ruler fine adjustment means;

FIG. 7 is a sectional view taken along the line D—D of FIG. 1 and showing base plate locking means;

FIG. 8 is a sectional view taken along the line E—E of FIG. 1 and showing protractor locking means;

FIG. 9 is a sectional view taken along the line F—F of FIG. 1 and showing ruler angle indication dial means according to the invention; and FIG. 10 is a plan view for explanation of the ruler angle indication dial means shown in FIG. 9.

DESCRIPTION OF A PREFERRED EMBODIMENT OF THE INVENTION

Figure 4:
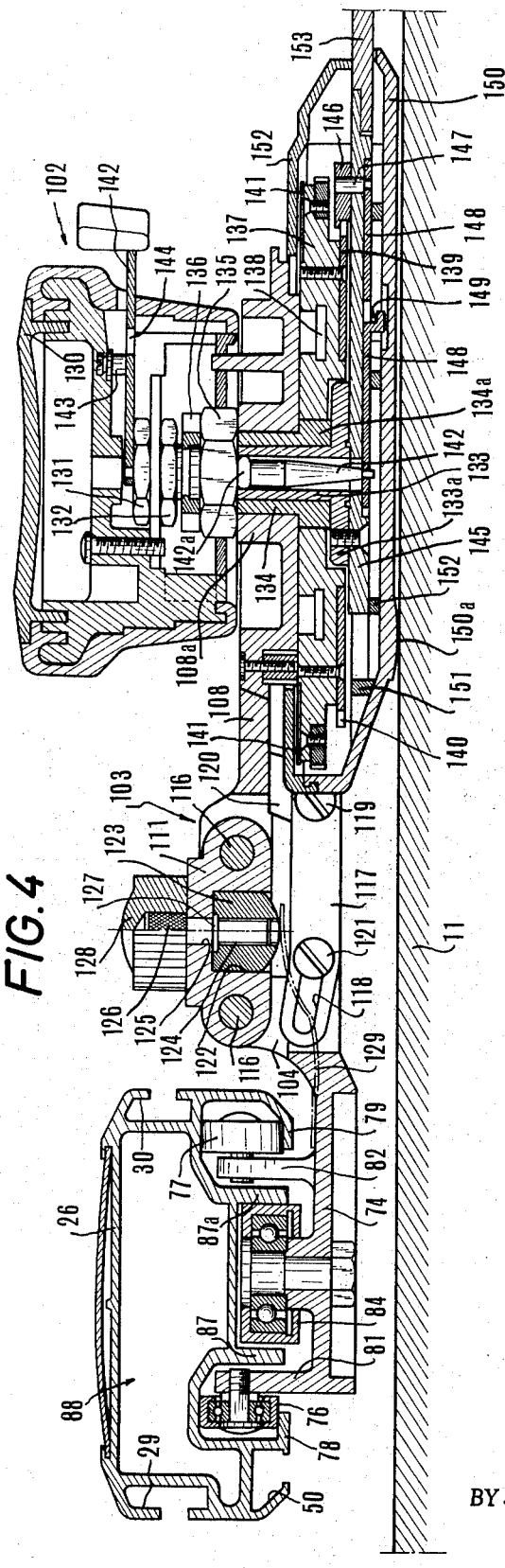
FIG. 4 is a sectional view taken along the line A—A of FIG. 1.

A preferred embodiment of this invention will now be described with reference to the accompanying drawings. First, there will be described one embodiment of a drawing instrument in which the protractor and degree indicator are incorporated;

There is provided a drawing board 11 which is constructed such that its surface can be moved from a position in which it is disposed parallel to the horizontal to a position in which it is tilted about 90° with respect to the horizontal and can be positioned at any degree as desired within the aforementioned angle of inclination. An X-rail 12 is firmly secured to one marginal portion of the surface of the drawing board 11 in a manner shown in FIG. 2.

The X-rail 12 has formed in its side wall with a mounting portion 13 which is ⊐-shaped in cross-section and disposed lengthwise of the rail, and a mounting opening 14 is formed lengthwise of the rail in a vertical planar bar member 13a of the mounting portion. 15 is a lock member slidably fitted in the mounting opening 14 and having attached to one end thereof a flange 16 which is disposed within the hollow portion of the mounting portion 13 and in face-to-face relationship with the inner wall surface of the planar bar member 13a.

17 is an L-shaped supporter removably secured to an end portion of the drawing board 11 and having secured at its upper end portion a member 18 which is positioned against the upper surface of the drawing board 11. Threadably connected to a horizontal portion 17a formed in the lower portion of the supporter 17 is a clamp screw 19 which presses at one end portion thereof against the underside of the drawing board 11 through a washer 20. The supporter 17 includes a vertical portion 17b which is positioned against a side surface of the drawing board 11. A hole 21 having an internally threaded portion 21a is formed substantially in the central portion of the vertical portion 17b of the supporter 17 and extends as far as its lower end. The hole 21 opens substantially in the intermediate portion of a horizontal hole 22 formed in the vertical portion 17b of the supporter.

The lock member 15 is slidably fitted in the horizontal hole 22 and has formed on its inner peripheral surface a groove 23 which is formed with a tapering surface 15a. 24 is an externally threaded rod threadably fitted in the internally threaded portion 21a of the hole 21. The externally threaded road 24 has a tapering end portion which is adapted to be positioned against the tapering surface 15a of the lock member 15 slidably fitted in the horizontal hole 22.

If the externally threaded rod 24 of the aforementioned construction is turned while the lock member 15 is inserted in the horizontal hole 22 of the supporter 17 to bring one end portion of the rod 24 into pressing engagement with the tapering surface 15a of the groove 23 in the lock member 15, the lock member 15 will be pushed and moved upwardly and leftwardly in FIG. 2 by the one end portion of the rod 24 and displaced leftwardly within the horizontal hole 22, so that the flange 16 is brought into pressing engagement with the planar bar member 13a and the X-rail 12 is secured to the supporter 17. If the threaded rod 24 is turned in an opposite direction so as to move the one end portion thereof away from the tapering surface 15a of the groove 23, the flange 16 will be released from pressing engagement with the X-rail 12, thereby permitting the X-rail 12 to move lengthwise thereof. Also, if the threaded rod 24 is turned to withdraw the one end portion thereof from the horizontal hole 22, it will be possible to withdraw the lock member 15 from the horizontal hole and to remove the X-rail 12 from the supporter 17.

25 is an X-carsol slidably mounted on the X-rail 12. A Y-rail 26 is connected at one end thereof to the X-carsol 25. The manner in which the Y-rail 26 is connected to the X-carsol 25 is shown in detail in FIGS. 1, 2 and 3. 27 and 28 are mounting plates arranged in channels 29 and 30 respectively which are formed on opposite sides of the Y-rail 26. Support plates 31 and 32 are secured at their upper portions to the mounting plates 27 and 28 by screws 33 and 34 respectively. By being clamped by the screws 33 and 34, the mounting plates 27 and 28 are brought into pressing engagement with wall surfaces of the Y-rail 26 in which the channels 29 and 30 are formed.

The support plates 31 and 32 have lower portions which are disposed on opposite sides of a hinge 25a of the X-carsol 25 in face-to-face relationship with each other. Secured to the hinge 25a are bearings 35 and 36 which are formed with tapering holes 35a and 36a respectively. Disposed in pressing engagement with the tapering holes 35a and 36a of the bearings 35 and 36 are tapering front ends of clamp screws 39 and 40 which are adapted to be threadably engaged in internally threaded holes 37 and 38 formed in the lower portions of the support plates 31 and 32 respectively. When the tapering front ends of the clamp screws 39 and 40 are brought into pressing engagement with the tapering holes 35a and 36a of the bearings 35 and 36 respectively and the Y-rail 26 is connected at one end thereof to the hinge 25a of the X-carsol 25, the Y-rail 26 is disposed at right angles to the X-rail 12.

The Y-rail 26 can be moved pivotally in a vertical direction with respect to the surface of the drawing board 11 about the tapering holes 35a and 36a of the bearings 35 and 36 respectively which are secured to the X-carsol 25. Rollers 41, 42, 43 and 44 which rotate in a horizontal direction with respect to the X-carsol 25 and rollers 45, 46, 47 and 48 which rotate in a vertical direction with respect to the X-carsol 25 are rotatably supported by the X-carsol 25. The rollers 42 and 44 are positioned against one side surface of a rail 49 attached to the underside of the X-rail 12 and as disposed lengthwise thereof, and the rollers 41 and 43 are positioned against the other side surface of the rail 49. The rollers 45 and 47 are disposed on a rail 12a formed in one side portion of the X-rail 12 and which is substantially parallel to the surface of the drawing board 11, and the rollers 46 and 48 are disposed on a rail 12b formed in the other side portion of the X-rail 12 to be substantially parallel to the surface of the drawing board 11.

The rollers 45, 46, 47 and 48 are subjected to a vertically and downwardly directed load applied to the X-carsol 25 when the latter moves and rollingly move along the rails 12a and 12b. At the same time, the rollers 41, 42, 43 and 44 rollingly move along the rail 49 while their direction of movement is guided by the rail 49 so that the rollers 41, 42, 43 and 44 may move in a straight line, thereby preventing rolling of the X-carsol 25 from side to side.

Figure 5:
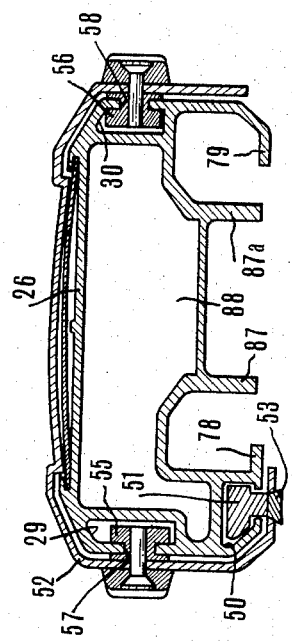
FIG. 5 is a sectional view taken along the line B—B of FIG. 2.

Brake means for locking the X-carsol 25 in any position as desired on the X-rail 12 will now be described. A guide groove 50 (see FIG. 5) is formed in the Y-rail 26 to be disposed lengthwise thereof, and a movable rod 51 is slidably received in the guide groove 50. The movable rod 51 is mounted on a slider 52 by screws 53 and 54. The slider 52 is slidably mounted on the Y-rail 26 and has inwardly extending projections 55 and 56 which are slidably recived in guide channels 57 and 58 respectively which are formed in the Y-rail 26 lengthwise thereof.

Attached to the front end of the moving member 51 is a rack gear 59 with which is maintained in meshing engagement a segmental gear 60 rotatably supported by the support plate 31 through a shaft. 61 is a cam rotatably supported on the support plate 31 on a shaft. The cam 61 includes an arm 62 which has formed at its front end an engaging groove 63 in which is slidably received a pin 64 projecting from the segmental gear 60 in an eccentric position. The cam 61 also includes a projection 61a which is adapted to press against a pressure receiving portion 65b bent up from a projection 65a of a brake 65.

The brake 65 is juxtaposed at one end portion 65c thereof to one side surface of a web portion 66 formed integrally with the rail 49 of the X-rail 12, and is rotatably connected at the other end thereof to one end portion of a bent brake 68 by a screw 67. The bent brake 68 is rotatably mounted substantially at its intermediate portion on to the X-carsol 25 by a screw 69. The bent brake 68 is juxtaposed at the other end portion thereof to the other side surface of the web portion 66 of the X-rail 12. Friction members 70 and 71 are attached to the other end portion of the bent brake 68 and one end portion 65c of the brake 65 respectively.

72 is a spring attached to the X-carsol 25 which urges by its biasing force one end portion of the brake 65 and the other end portion of the bent brake 68 to move outwardly. 73 is a stop for precluding the upward movement of the projection 65a of the brake 65 away from the X-carsol 25. The stop 73 is secured at one end thereof to the X-carsol 25.

If the slider 52 of the aforementioned construction is moved in sliding motion in the direction of the arrow H along the guide groove 50 of the Y-rail 26 so as to move the movable rod 51 in the direction of the arrow H, the pin 64 will pivotally move by virtue of the meshing engagement of the segmental gear 60 with the rack gear 59 so that the arm 62 of the cam 61 will move pivotally in conjunction with the pivotal movement of the pin 64, with the result that the cam 61 will rotate a predetermined amount in a clockwise direction in FIG. 2 and the projection 61 will be displaced. This causes the projection 61a of the cam 61 to push and move the pressure receiving portion 65b of the brake 65.

If the pressure receiving portion 61a is moved, one end portion 65c of the brake 65 will be brought into pressing engagement with one side surface of the web portion 66 of the X-rail 12 through the friction member 70 and against the biasing force of the spring 72. At the same time, the pressing force exerted on the brake 65 will be transmitted to the bent brake 68 which is rotated in a counterclockwise direction in FIG. 3 about the screw 69, with a result that the bent brake 68 will be brought at the other end portion thereof into pressing engagement with the other side surface of the web portion 66 of the X-rail 12 through the friction member 71 and against the biasing force of the spring 72. In this condition, the X-carsol 25 is locked to the X-rail 12. The X-carsol 25 is unlocked if the slider 52 is moved a predetermined amount along the Y-rail 26 in a direction opposite to the direction of the arrow H.

74 is a Y-carsol slidably mounted on the Y-rail 26 and shown in detail in FIGS. 1 and 4.

75, 76 and 77 are rollers disposed on horizontal rail members 78 and 79 of the Y-rail 26 and rotatably supported on shafts by mounting portions 80, 81 and 82 respectively. 83, 84 and 85 are rollers rotatably held against vertical rail members 87 and 87a of the Y-rail 26 respectively and rotatably supported by the Y-carsol 74.

The rollers 75, 76 and 77 are subjected to a load which is applied to the Y-carsol 74, and the rollers 83, 84, 85 and 86 control the direction of movement of the Y-carsol 74 along the Y-rail 26 to cause the same to move in a straight line.

A weight 89 is slidably mounted in a weight receiving space 88 of the Y-rail 26 and connected to the Y-carsol 74 by a rope 90 which is guided by rope pulleys 91 and 92 rotatably connected to opposite end portions of the Y-rail 26. The weight 89 and Y-carsol 74 are connected to each other by the rope 90 such that, when the drawing board 11 is tilted, forces of gravity which cause them to move downwardly cancel each other. By connecting the weight 89 to the Y-carsol 74 in this way, a sudden downward movement of the Y-carsol 74 along the surface of the drawing board 11 which might otherwise be caused to occur by a force acting on the X-carsol 74 when the drawing board 11 is moved from a horizontal position to a tilted position can be precluded. The Y-carsol 74 is caused to stop in any position as desired on the Y-rail 26 irrespective of the tilting of the drawing board by a pull-up force proportional to the angle of tilting of the drawing board 11 which is produced by the force of gravity acting on the weight 89.

93 is a tail roller rotatably attached to the other end of the Y-rail 26 and adapted to be rotatably positioned against the surface of the drawing board 11. When the tail roller 93 is positioned against the surface of the drawing board 11, the Y-rail 26 is disposed parallel to the surface of the drawing board 11.

Brake means for locking the Y-carsol in any position as desired on the Y-rail 26 will now be described. 94 is a lever pivotally supported by the Y-carsol 74 on a shaft. The lever 94 has at one end portion a pusher 94a which is positioned against a side portion of a bent brake 95. The bent brake 95 has formed at one end portion thereof a bent portion 95a which has attached thereto a friction member 96 which is positioned against an outer side surface of the vertical rail 87a formed in the Y-rail 26. The bent brake 97 is rotatably connected at one end portion thereof to the other end portion of bent brake 95 by a screw 98. The bent brake 97 is rotatably mounted substantially at its intermediate portion on the Y-carsol 74 on a screw 99. The bent brake 97 has formed at the other end thereof a bent portion 97a which is positioned against an outer side surface of the vertical rail member 87 of the Y-rail 26 and which has attached thereto a friction member 100. 101 is a spring connected to the Y-carsol 74 by a screw which urges by its biasing force one end portion of the bent brake 95 and the other end portion of the bent brake 97 away from each other.

If the lever 94 of the aforementioned construction is moved pivotally in the direction of the arrow I, the pusher 94a of the lever 94 will be displaced and push and move the bent brake 95 leftwardly in FIG. 1, so that the bent portion 95a of the brake 95 is brought into pressing engagement with the vertical rail member 87a of the Y-rail 26 through the friction member 96. At the same time, the pressing force exerted by the pusher 94a is transmitted to the bent brake 97 and causes the same to pivotally move in a clockwise direction about the screw 99, so that the bent portion 97a of the brake 97 is brought into pressing engagement with the vertical rail member 87 of the Y-rail 26 through the friction member 100 and the Y-carsol 74 is locked in any position as desired on the Y-rail 26.

If the lever 94 is returned to its original position, the Y-carsol 74 will be unlocked and rendered free to move along the Y-rail 26.

102 is a head which is mounted on the Y-carsol through a head connecting mechanism 103 which is shown in detail in FIGS. 1 and 4. The head connecting mechanism 103 will now be described.

Mounting blocks 104 and 105 spaced apart a predetermined distance from each other are provided on the Y-carsol 74 in face-to-face relationship with each other. The mounting blocks 104 and 105 are formed with internally threaded bores 106 and 107 respectively which are disposed on a straight line.

The head 102 includes a member 108 attached thereto and having formed at one end portion thereof mounting blocks 109 and 110 which have internally threded bores (not shown) respectively which are disposed on a straight line.

111 is a connector which is held on opposite side surfaces thereof for pivotal motion by clamp screws 112 and 113 and 114 and 115 threadably engaged in the mounting blocks 104 and 105 and 109 and 110 respectively. The clamp screws 112 and 113 are disposed on a straight line, and the clamp screws 114 and 115 are disposed on a straight line. These clamp screws taper at their front ends and their tapering front ends are rotatably pressed into tapering bores of four shaft supporters 116 to opposite side surfaces of the connector 111.

117 is a connecting ring which has formed with a relief slot 118 at one end portion thereof and which is pivotally mounted on a projection 120 of the member 108 an a screw 119. A screw 121 secured to the Y-carsol 74 has a stem which is slidably received in the relief groove 119 formed in the connecting ring 117. The screw 121 is normally disposed at the right end of the relief groove 118 in FIG. 4. Assuming that the line connecting the clamp screws 112 and 113 at their center is A and the line connecting the clamp screws 114 and 115 at their center is B, then the lines A and B are parallel to each other. Assuming that a line connecting the two lines A and B together and disposed normal thereto is C, then the line C has a length which is equal to the length of the line D connecting the center of the screw 119 with the center of the screw 121 which screws support the connecting ring 117 at opposite ends thereof. The lines C and D are parallel to each other.

Accordingly, the head connecting mechanism 103 is constructed in the form of a pantagraph mounting mechanism. 122 is a square guide opening formed on the underside of the connecting member 111 for slidably receiving a slide block 123 therein. 124 is a threaded rod threadably connected to the block 123 and inserted in a bore 125 formed in the connecting member 111. The threaded rod 124 is rotatably positioned by means of a head 126 and a flange 127. The head 126 has a knob 128 attached thereto.

129 is a plate spring which is secured at one end portion thereof to the Y-carsol 74 by screws and which is maintained at the other end portion thereof in contact with the underside of the slide block 123, so that the number 108 is urged to move upwardly by the biasing force of the plate spring 129 through the slide block 123.

130 is a handle of the head 102 which is rotatably secured to a rotary tube 133 by nuts 131 and 132. 134 is an outer tube fitted within a tubular portion 108a of the member 108 and having a flange 134a projecting from the outer peripheral surface of the lower portion thereof and threadably engaged by a nut 135.

By turning the nut 135 in a direction in which it is tightened against the screw, the nut 135 and flange 134a can be brought into pressing engagement with the upper and lower surfaces of the tubular portion 108a respectively, so that the outer tube 134 is firmly secured to the member 108. 136 is a nut for preventing loosening of the nut 135 which threadably engages a threaded portion formed on the upper portion of the outer tube 134 to press against the nut 135.

137 is a protractor slidably fitted over the outer peripheral surface of the flange 134a of the outer tube 134. The protractor 137 has formed in its upper surface an annular groove 138 of convex-shaped cross-section and has an index ring 139 secured to its underside. The index ring 139 has formed on its outer peripheral surface engaging recesses 140 which are spaced apart from one another a distance corresponding to an angle of 15°. 141 is a scale indicator attached to the upper surface of the protractor 137 and calibrated in degrees. 142 is an operation lever connected at one end portion thereof to the upper end of a conical rod 142 disposed in the rotary tube 133 and having, in a suitable position, an opening 144 for receiving therein a stop 143 of the handle 130 when the lever 142 is pushed, lengthwise thereof.

145 is a base plate attached to the flange 133a of the rotary tube 133 and pivotally supporting one end portion of a lock pawl member 146 on a shaft. The member 146 has formed at the other end thereof a pawl which is disposed against the engaging recesses 140 of the index ring 139 and shaped such that it is adapted to be received in one of the engaging recesses 140.

A shaft 147 is mounted on the lock pawl member 146 substantially midway between opposite ends thereof and is rotatably connected to one end of a connecting rod 148 which is connected at the other end portion thereof to the lower end portion of the conical rod 142. The connecting rod 148 is urged by the biasing force of a spring 149 to move upwardly and leftwardly in FIG. 4.

150 is a lower cover firmly secured to the base plate 145 by rings 151 and 152. The lower cover 150 has formed on the underside thereof a plurality of convex curve portions 150a so that the underside of the lower cover 150 will be maintained in point contact with the surface of the drawing board 11 through the convex curve portions 151.

152 is an upper cover made of a transparent material and attached to the lower cover 150. The upper cover 152 has superposed on its upper surface an index 152a which indexes with the scales of the scale indicator 141. Angular displacements of the base plate 145 can be indicated quantitatively by changes in the relative positions of the index 152a and the protractor 137 when the base plate 145 is angularly rotated.

153 is a ruler mounting plate rotatably supported by the base plate on a shaft. A fine adjustment 154 is mounted on the ruler mounting plate 153 in a position which is spaced apart a predetermined distance from the position in which the cover 152 is supported by the base plate 145. The fine adjustment 154 is shown in detail in FIG. 6. Openings 155 and 156 are concentrically formed in the base plate 145 and ruler mounting plate 153 respectively in portions thereof which are connected together, the opening 156 slidably receiving the threaded rod 157, therein and the opening 155 loosely receiving the threaded rod 157.

158 as seen in FIG. 6 is an eccentric plate rotatably fitted in an eccentric position over the threaded rod 157 and having an outer peripheral surface which is rotatably fitted in the opening 155. 159 is a presser integral with the eccentric plate 158 and rotatably fitted over the threaded rod 158. 160 is an internally threaded tube which threadably receives therein the threaded rod 158. The internally threaded tube 160 has an upper portion which is secured to a lever 162 by a screw 161. The tube 160 is juxtaposed at its lower end surface with the upper surface of the presser 159.

163 is a flange attached to the lower end of the threaded rod 157 and juxtaposed to the unnderside of the base plate 145. 164 is a vertical ruler member and 165 is a horizontal ruler member. The two members 164 and 165 are removably connected to the ruler mounting plate 153 by screws 166 and 167. When the convex curve portions 150a of the lower cover 150 are in contact with the surface of the drawing board 11, the ruler members 164 and 165 are maintained in a horizontal position and in contact, at their underside, with the surface of the drawing board 11.

FIG. 7 shows base plate lock means 168. Rotatably fitted in an opening 170 formed in the base plate 145 is a threaded rod 169 having attached to its lower end portion a flange 171 juxtaposed to the underside of the base plate 145. An internally threaded tube 173 having an angle lever 172 attached thereto is threadably fitted over the upper portion of the threaded rod 169. 174 is a brake block slidably fitted over the threaded rod 169. The brake block 174 has one end portion 174a slidably disposed between the underside of the protractor 137 and the upper surface of the index ring 139. A projecting lower end surface 174b of the internally threaded tube 173 is positioned against the upper surface of the brake block 174.

175 is protractor lock means which is shown in detail in FIG. 8 in which an internally threaded member 176 is slidably fitted in an opening 177 formed in the member 108 so that a flange 176a attached to the outer peripheral surface of the member 176 is positioned against the upper surface of the member 108. A threaded rod 178 is threadably received in the internally threaded member 176 to which a base line lever 179 is secured by a screw 180. Formed at one end of the threaded rod 178 integrally therewith is a flange 181 which is slidably received in the annular groove 138 of the protractor 137.

If the handle 130 of the aforementioned construction is turned, the rotation of the handle 130 will be transmitted to the rotary tube 133, base plate 145, ruler mounting plate, ruler members 164 and 165, lock pawl member 146, index ring 139 formed with the engaging recesses 140 adapted to receive the pawl of the member 146, and protractor, so that it is possible to move the ruler members 164 and 165 into any angular position as desired. In this condition, the base plate 145 is set at an angle of 0° with respect to the protractor 137.

After the handle 130 is rendered free to rotate, either one of the ruler members 164 and 165 is brought into index with the base line of a drawing sheet on the drawing board 11 and the base line lever 179 is pivotally moved so as to rotate the internally threaded member 176 in a direction in which the threaded rod 178 moves upwardly. This will bring the flange 181 of the threaded rod 178 into pressing engagement with the annular groove 138 and the flange 176a of the internally threaded member 176 into pressing engagement with the upper surface of the member 108. By being held between the two flanges 176a and 181, the protractor 137 is locked with respect to the member 108.

When it is desired to tilt the ruler members 164 and 165 by about 15° with respect to base the line, the operation lever 142 is pushed lengthwise thereof so as to pivotally move the conical rod 142 in a counterclockwise direction in FIG. 4 within the rotary tube 133 about a major diameter portion 142a thereof. Rotary displacement of the conical rod 142 will move the connecting rod 148 rightwardly along the underside of the base plate 145. The shaft 147 coupled to the connecting rod will also move rightwardly, causing the lock pawl member 146 to move pivotally at one end portion thereof so as to release its pawl from engagement with one of the engaging recesses 140 of the index ring 139.

When the lock pawl member 146 is released from engagement with the index rong 139, the base plate 145 is rendered free relative to the protractor 137. In this condition, if the handle 130 is turned to angularly move the base plate 145 and if a pressing force exerted on the operation lever 142 is removed, the connecting rod 148 will be urged by the biasing force of the spring 149 to return to its original position and the pawl of the lock pawl member 146 will be brought by the biasing force of the spring 149 into resilient engagement with the outer peripheral surface of the index ring 139 till the pawl is received in engagement with another or adjacent engaging recess 140, so that the base plate 145 is locked with respect to the index ring 139 through the lock pawl member 146.

As aforementioned, the engaging recesses 140 are spaced apart from one another a distance corresponding to an angle of 15°, so that the ruler members 164 and 165 are displaced by an angle of 15° from the original position with respect to the base line by the aforementioned operation. By fitting the stop 143 in the opening 144 formed in the lever 142, it is possible to lock the lever 142 in a position to which it has been pushed and moved.

By pivotally moving the angle lever 172, it is possible to lock the base plate 145 with respect to the protractor 137 at any angle as desired while the lock pawl member 146 is being released from engagement in the engaging recesses 140 of the index ring 139. Pivotal movement of the angle lever 172 will result in the brake block 174 being pressed by the underside of the internally threaded tube 173 and one end portion of the block 174 being brought into pressing engagement with the upper surface of the index ring 139, so that the base plate will be locked with respect to the protractor 137.

When it is desired to effect fine adjustments of the angle between the ruler mounting plate 153 and the base plate 145 in a direction parallel to the surface of the drawing board by pivotally moving the ruler mounting plate 153 about its pivot while the base plate 145 remains fixed, the presser 159 is moved to rotate the eccentric plate 158 within the opening 155. Since the center of rotation of the eccentric plate 158 is immovably held by the threaded rod 157, rotation of the eccentric plate 158 will result in the ruler mounting plate 153 being slightly displaced an amount corresponding to the amount of eccentricity of the eccentric plate 158. If the lever 162 is turned in a direction in which the tube 160 is clamped onto the threaded rod 157, the connecting portions of the base plate 145 and ruler mounting plate 153 will be locked by being held between the presser 159 and the flange of the Threaded rod 157.

The operation of moving the head 102 and ruler members 164 and 165 upwardly away from the surface of the drawing board 11 and bringing the same into an upright position is as follows. If the handle 130 is pulled upwardly by hand, the head 102 and ruler members 164 and 165 will move upwardly in a predetermined range into a position in which they are maintained parallel to the surface of the drawing board 11, because the member 108 and Y-carsol 74 are connected to each other by the pantagraph connection mechanism 103. Moreover, if the handle 130 is pulled upwardly in a direction in which the ruler members 164 and 165 are brought into an upright position with respect to the surface of the drawing board 11, the pantagraph connection mechanism 103 immediately loses its parallelgrammic shape, with the relief groove 118 formed in the connecting ring 117 moving in sliding motion along the screw 121 and the lower side of the parallelogram being elongated, thereby bringing the head 102 and ruler members 164 and 165 into a position in which they are upright with respect to the surface of the drawing board 11.

If the knob 128 is turned to rotate the threaded rod 124 while the head 102 and ruler members 164 and 165 are disposed parallel to the drawing board 11 with the undersides of the former being maintained in intimate contact with the surface of the latter, the slide block 123 threadably connected to the threaded rod 124 will move downwardly along the guide opening 122 and the resilient force of the spring 129 acting on the slide block 123 will increase in intensity in proportion to the increase in the distance of downward movement of the slide block 123. As a result, the connecting member 111 will be pivotally moved upwardly about the screws 112 and 113 by the resilient force of the spring 129, so that the head 102 and ruler members 164 and 165 connected to the connecting member 111 will move upwardly a predetermined distance from the surface of the drawing board 11 while being maintained parallel thereto.

The intensity of the resilient force required for moving the head 102 and ruler members 164 and 165 upwardly away from the surface of the drawing board 11 may vary depending on the angle of inclination of the drawing board 11. It is possible to move the head 102 and ruler members 164 and 165 upwardly away from the surface of the drawing board 11 with a resilient force of lower intensity when the angle of inclination is greater than when the angle of inclination is smaller. Accordingly, when the angle of inclination of the drawing board 11 is varied with respect to the horizontal, it is required to adjust the resilient force of the spring acting on the connecting member 111 by turning the knob 128 an amount which may vary depending on the variation in the angle of inclination.

When it is desired to reduce frictional dragging of the head 102 and ruler members 164 and 165 on the drawing board 11, it will not be necessary to move them upwardly by the biasing force of the spring 129 so that their undersides will be completely spaced apart from the surface of the drawing board. To this end, the resilient force of the spring 129 acting on the connecting member 111 may be adjusted such that the biasing force is sufficiently high in intensity to reduce the frictional dragging while the head 102 and ruler members 164 and 165 are maintained in contact with the drawing board 11.

The minute indicating dial of the present invention will now be explained in detail.

182 is dial means for indicating the angle of the ruler means which is shown in detail in FIGS. 9 and 10. 183 is an intermediate gear adapted to mesh with a gear 184 attached to the protractor 137 and mounted concentrically therewith along its outer peripheral surface. Formed on the underside of the central portion of the gear 183 is an annular prejection 185 which is rotatably fitted in a tapering hole 187 formed in a planar bar portion 186a of a resilient supporter 186, with the outer peripheral surface of the annular projection 185 being maintained in point contact with the hole 187.

The resilient supporter 186 is secured at one end portion thereof to the base plate 145 by a screw, so that the intermediate gear 183 is caused to press against the gear 184 by the resilient force of the resilient supporter 186.

188 is a U-shaped mounting member which is secured to the base plate 145 by screws 189 and 190. 191 is a cylindrical member which is secure to the mounting member 188 by screws 192 and 193. The cylindrical member 191 has formed on the inner peripheral surface of its lower portion an increased thickness portion 191a of semi-circular shape to which one end portion of another resilient supporter 194 is secured. A frame 196 is fitted over the upper portion of the cylindrical member 191 through a ring 195. A dial 197 resting on the upper end surface of the cylindrical member 191 is fitted on the inner peripheral surface of the frame 196. The dial 197 is calibrated in degrees ranging from 0° to 5° and also in minutes.

198 is a threaded rod threadably connected to a side portion of the cylindrical member 191. A ]-shaped plate 199 is slidably fitted over the threaded rod 198 to threadably urge the rod 198 to move inwardly of the cylindrical member 191 so that one end of the ]-shaped plate 199 presses against the frame 196, thereby locking the frame 196 with respect to the cylindrical member 191.

200 is a shaft extending through an opening formed in the center of the dial 197. A pointer 201 is attached to the upper end of the shaft 200 and is disposed normal thereto, and a pinion 202 adapted to mesh with the intermediate gear 183 is attached to the lower end of the shaft 200. An annular groove is formed circumferentially in the center of the outer peripheral surface of the pinion 202, and a substantially trinagular opening is formed in a plate member 194a of the resilient supporter 194. The pinion 202 is fitted in the substantially triangular opening and the annular groove of the former is brought into engagement with edges of the opening forming the smallest angle of its substantially triangular shape, so that the pinion 202 is rotatably supported by the substantially triangular opening and caused by the resilient force of the resilient supporter 194 to press against the intermediate gear 183. 203 is a cover made of a transparent material which is fitted over the frame 196.

If the handle 130 is turned to angularly rotate the base plate 145 the intermediate gear 183 mounted on the base plate 145 will revolve round the outer peripheral surface of the gear 184 with which it is maintained in meshing engagement a distance corresponding to the amount of angular movement of the base plate 145 while revolving on its own axis. Revolution of the intermediate gear 183 on its own axis is transmitted to the pinion 202 and the pointer 201 will be deflected on the dial 197 so as to indicate the amount of angular rotation of base plate 145 and hence the amount of angular rotation of the ruler members 164 and 165.

As aforementioned, the dial 137 is calibrated in minutes, so that it is possible to read the angle in degrees of the ruler member 164 and 165 on the protractor 137 as indicated by the index 152a and to read the angles in minutes thereof on the dial 197 as indicated by the pointer 201. By loosening the threaded rod 198, it is possible to release the ]-shaped plate 199 from pressing engagement with the frame 196 and cause the same to move angularly. This permits angular movement of the dial 197 coupled to the frame 196.

Accordingly, when it is desired to draw a line $l'$ (not shown) which intersects a given line $l$ accurately at 2° and 30′, for example, the ruler members 164 and 165 are moved angularly to bring one of them into alignment with the line $l$. Then, the dial 197 is rotated angularly to bring the zero scale on the dial 197 into index with the pointer 201. Thereafter, the threaded rod 198 is clamped to lock the frame 196 with respect to the cylindrical member 191. If the ruler members 164 and 165 are moved angularly and stopped when the pointer 201 indicates 2° 30′ on the dial 197, then the other ruler member is accurately disposed at an angle of 2° 30′ with respect to the line $l$.

We claim:

1. A drawing instrument comprising a drawing board, a head mounted for movement along the X-Y axis on the drawing board and parallel thereto, ruler means on said head, a mechanism for angularly displacing said ruler comprising a protractor mounted on said head for normally being maintained at a predetermined angle with respect to the X-Y axis on the drawing board irrespective of the movement of the head, and a rotary tube rotatably extending through the center of the protractor, a handle on the upper end of said tube and a base plate secured to the lower end of said tube, said ruler means being connected to the base plate, a degree indicator disposed on the base plate and adapted to move along a scale calibrated in degrees of angles on the protractor as the base plate moves in pivotal motion so as to indicate the amount of angular displacement in degrees of the base plate with respect to the protractor, a first gear mounted on said protractor concentrically therewith and disposed along the outer periphery thereof, a second gear meshing with said first gear and rotatably mounted on the base plate, a pointer supporting shaft rotatably coupled with said second gear for rotation thereby, a pointer on said pointer supporting shaft, and a dial having a scale calibrated in minutes of angles over which said pointer moves, whereby when the handle is turned the base plate connected to the rotary tube can be angularly rotated about the center of the protractor, and at this time the second gear mounted on the base plate revolves around the first gear mounted on the protractor while being rotated on its own axis, the rotation on its own axis of the gear mounted on the base plate moving the pointer supporting shaft to move the pointer across the dial so that the amount of deflection of the pointer on the scale indicates the angular displacement in minutes of the ruler means connected to the base plate and said ruler means, said dial and said degree indicator move in the same direction as the base plate connected to the rotary tube is angularly rotated about the center of the protractor.

2. A drawing instrument as claimed in claim 1 further comprising a third gear mounted on the pointer supporting shaft in meshing engagement with the second gear mounted on the base plate, the third gear mounted on the pointer supporting shaft and the first gear mounted on the protractor being spaced from each other a distance which is sufficiently great to prevent overlapping of the dial on the protractor.

* * * * *